No. 874,748. PATENTED DEC. 24, 1907.
W. DIX.
TRAP NEST.
APPLICATION FILED MAR. 16, 1907.
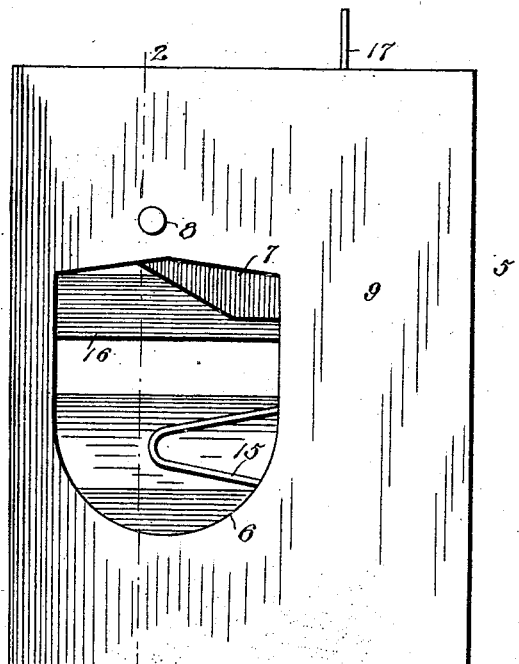
Fig. 1.
Fig. 2.  Fig. 3.
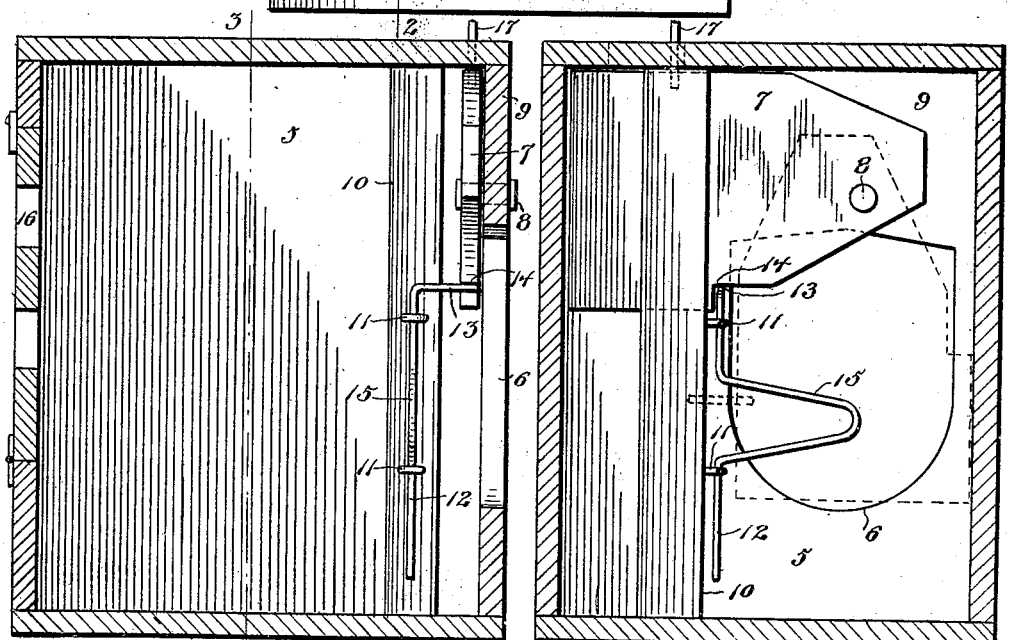
WITNESSES:  INVENTOR
Arthur Wesley  William Dix
M. A. Schmidt  BY
 Attorneys

UNITED STATES PATENT OFFICE.

WILLIAM DIX, OF LAKEWOOD, NEW JERSEY.

TRAP-NEST.

No. 874,748.  Specification of Letters Patent.  Patented Dec. 24, 1907.

Application filed March 16, 1907. Serial No. 362,636.

*To all whom it may concern:*

Be it known that I, WILLIAM DIX, a citizen of the United States, residing at Lakewood, in the county of Ocean and State of New Jersey, have invented certain new and useful Improvements in Trap-Nests, of which the following is a specification.

This invention relates to poultry nests, and more particularly that kind known as trap-nests which are used by poultrymen for keeping a laying record, and for other purposes.

The invention comprises a nest having a door which is automatically closed when the hen or other fowl enters the nest, thus preventing the escape of the hen and also the entrance of other fowls to the nest.

In the accompanying drawing, Figure 1 is a front elevation of the invention. Fig. 2 is a longitudinal section on the line 2—2 of Fig. 1. Fig. 3 is a transverse section on the line 3—3 of Fig. 2.

Referring specifically to the drawing, the nest 5 is a box-like structure. In the front wall of the box is an opening 6 through which the hen enters. The door 7 controlling said opening is pivoted at its top end at 8 to the front wall 9 of the box on the inside thereof, above the opening, so that it can be swung away from said opening to permit the hen to enter the nest. The pivot extends transversely through the door so that it swings edgewise toward and from the opening. Adjacent the opening, inside the box, is an upright or post 10 into one side of which are screwed eye-bolts 11 which serve as bearings or supports for a trigger which controls the door. The trigger comprises a rod 12 which is mounted in the eye-bolts 11 to turn freely therein. At the top end of the rod is a horizontal arm 13 which is adapted to engage a notch 14 in one of the edges of the door when it is in elevated position and thereby hold it in such position. Below the arm 13 a loop 15 is made in the rod. This loop is presented at substantially a right angle to the arm so that it will extend across the opening 6 inside the nest when the door is in elevated position.

The operation of the nest is as follows: The hen upon entering the nest through the opening 6 will come in contact with the loop 15 and thereby turn the rod 12 in its bearings 11. When the rod turns, the arm 13 is withdrawn from the door 7 whereupon the latter drops by gravity over the opening and traps the hen. The opening is adjacent one of the side walls of the box so that said wall may also serve as a stop for the downward swing of the door. In the rear wall of the box is a door 16 through which the hen can be removed after which the parts are re-set by opening the door 7 and again engaging the trigger therewith.

The door 7 carries a signal device comprising a rod 17 projecting from one of its edges. When the door is open the rod is presented through an opening in the top of the box and when the door is closed the rod is withdrawn therefrom. The poultryman is therefore saved unnecessary trips to the nest as the position of the door and consequently the condition of the nest will be apparent at all times at a distance.

A nest constructed as herein described although simple and inexpensive in construction is thoroughly reliable in operation, and by its use the poultryman can keep an accurate record of his hens or other fowls.

I claim:—

1. In a nest-box having a door pivoted above the entrance thereto, a rotatable rod having an arm engageable with the door for holding it open, and means extending across the entrance for rotating the rod to withdraw the arm from the door.

2. In a nest-box having a door pivoted above the entrance thereto, a rotatable rod having an arm engageable with the door for holding it open, and a looped portion extending across the entrance for rotating the rod to withdraw the arm from the door.

3. In a trap-nest, a door for the entrance thereto, means operated by the fowl for closing the door, and a signal device carried by the door.

In testimony whereof I affix my signature, in presence of two witnesses.

WILLIAM DIX.

Witnesses:
CHARLES H. DIX,
ED. A. TICKNER.